United States Patent
Reschenauer

(10) Patent No.: US 10,547,246 B2
(45) Date of Patent: Jan. 28, 2020

(54) AUXILIARY SUPPLY FOR A CURRENT SUPPLY

(71) Applicant: Siemens Aktiengesellschaft, Munich (DE)

(72) Inventor: Stefan Reschenauer, Atzelsdorf (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/360,805

(22) Filed: Mar. 21, 2019

(65) Prior Publication Data
US 2019/0363640 A1 Nov. 28, 2019

(30) Foreign Application Priority Data
Mar. 22, 2018 (EP) ..................................... 18163249

(51) Int. Cl.
*H02M 7/06* (2006.01)
(52) U.S. Cl.
CPC ..................................... *H02M 7/06* (2013.01)
(58) Field of Classification Search
CPC .... H02M 7/06; H02M 3/158; H02M 3/33523; H02M 3/335
See application file for complete search history.

(56) References Cited

U.S. PATENT DOCUMENTS

2006/0152199 A1* 7/2006 Angquist ................ H02J 11/00
323/208

FOREIGN PATENT DOCUMENTS

| DE | 3735470 | 5/1989 |
| EP | 0260221 | 3/1988 |
| WO | WO2014032066 | 3/2014 |

* cited by examiner

*Primary Examiner* — Adolf D Berhane
*Assistant Examiner* — Afework S Demisse
(74) *Attorney, Agent, or Firm* — Cozen O'Connor

(57) ABSTRACT

An auxiliary supply for a current supply with at least one transformer with a primary side and a secondary side, wherein the auxiliary supply includes at least one frequency generator arranged on the primary side for generating an alternating voltage with predetermined frequency, a rectifier unit arranged on the secondary side for a secondary-side supply voltage and first and second potential separation units arranged between the primary side and the secondary side, where the first potential separation unit is connected on the primary side via, for example, a high-value impedance to the frequency generator, where on the primary side, the second potential separation unit has a high-frequency coupling to a reference potential assigned to the frequency generator and provides a low-ohmic capacitive connection between a secondary-side reference potential and the primary side, where it is possible to use a voltage drop at the impedance to evaluate the secondary-side supply voltage.

12 Claims, 1 Drawing Sheet

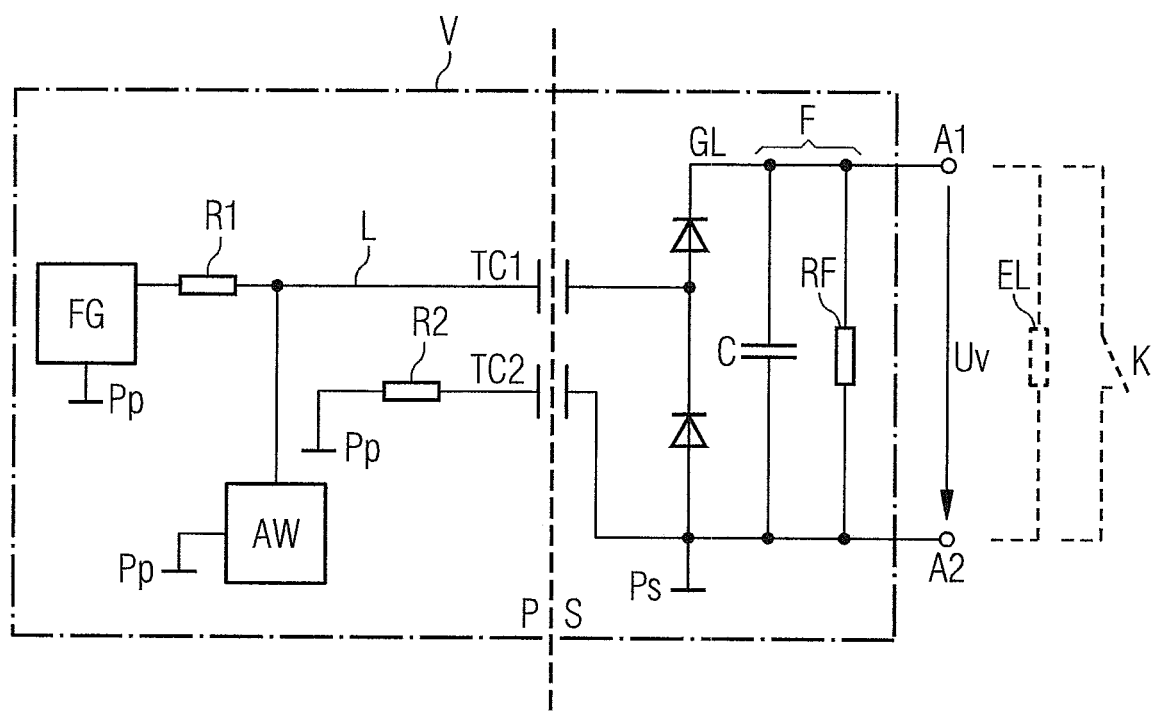

AUXILIARY SUPPLY FOR A CURRENT SUPPLY

BACKGROUND OF THE INVENTION

1. Field of the Invention

The present invention relates to an auxiliary supply for a current supply comprising at least one transformer with a primary side and a secondary side, where the auxiliary supply provides a voltage supply that is independent of the respective operating state for the secondary side, and where the auxiliary supply includes at least one frequency generator arranged on the primary side, a rectifier unit arranged on the second side for a secondary-side supply voltage and a first and a second potential separation unit arranged between the primary and the secondary sides.

2. Description of the Related Art

Current supplies are usually standalone devices or an assembly that are used to supply energy to consumers, i.e., in devices or assemblies. Here, these consumers frequently require a different voltage or a different current than that provided by a current supply network or current/voltage supply source. The current supply converts a mostly non-stabilized, direct or alternating voltage into a mostly constant and frequently predetermined output voltage. For this, it is usual to use voltage converters comprising a power transmitter or transformer. Voltage converters used are, for example, flux converters, isolating converters or resonant converters.

The transformer is used to transmit energy from a primary side of the current supply to a secondary side of the current supply. Here, the primary side of the current supply is usually connected to the current network or the current/voltage source. The output voltage for the respective consumers is usually provided on the secondary side.

In the case of current supplies formed as switched-mode power supplies or clocked current supplies, usually an instantaneous power value is directly dependent upon a clock ratio, i.e., on the ratio of the switch-on and switch-off time of the switching elements used, which are usually switched by a control device. Therefore, so-called auxiliary supplies for current supplies (in particular clocked current supplies) are used for the internal supply to the respective control devices or the entire control system.

There is a requirement for current supplies to be produced ever more cheaply. Consequently, savings are, for example, frequently made on auxiliary supplies on the secondary side because the output voltage of the switched-mode power supply is available on the secondary side in any event. However, with current supplies it may be necessary to provide additional mostly secondary-side control electronics, which must be supplied with energy independently of the instantaneously available output voltage of the switched-mode power supply. Furthermore, there may be a requirement for the current supply to comprise a connection option with which the output voltage is switched off in the event of a short circuit at a signal terminal. In this case, it is again necessary to ensure that there is a supply to components, such as control electronics or a pilot light. on the secondary side of the switched-mode power supply. However, components located on the secondary side of the transformer can only continue to be supplied by using expensive circuits if an output voltage from the switched-mode power supply is no longer provided, such as in the event of a short circuit, on remote switch-off or in standby mode.

The as yet unpublished patent application EP 16202606.6 discloses an auxiliary supply for a switched-mode power supply with a transformer or primary and secondary side. This auxiliary supply generates a voltage supply for units arranged on the secondary side independently of the operating state of the switched-mode power supply and applies an alternating voltage with a predetermined frequency, in particular a frequency from the high-frequency range, such as from the high kHz or MHz range, which is generated on the primary side by a frequency generator, to a galvanic isolation unit. This alternating voltage or this alternating current can then be tapped via the rectifier unit arranged on the secondary side and used to supply units arranged on the secondary side such as control electronics or pilot lights.

In the case of the auxiliary supply disclosed in the as yet unpublished document EP 16202606.6, furthermore series resistors are arranged on the primary side between the frequency generator and the galvanic isolation unit through the use of which the auxiliary supply can additionally be used for the transmission of information or signals from the secondary side to the primary side. The galvanic isolation unit, which can, for example, be formed as a capacitive separation unit in the form of two capacitors, is driven via the series resistors with high resistivity and inversely to the high frequency generated by the frequency generator. If a high-ohmic load is now imposed on the secondary-side output of the auxiliary supply, for example, this can be identified and evaluated accordingly. The floating potential signal formed herein has a high-ohmic coupling to the primary side.

However, particularly with the transmission of information or signals from the secondary side to the primary side, the auxiliary supply described in the as yet unpublished document EP 16202606.6 has relatively high susceptibility to interference such as, for example, from the field of electromagnet compatibility, high-frequency fluctuations or phase shifts between the primary and secondary side, interference in the switched-mode power supply, etc., which influence primary-side signal evaluation or the result of a measurement.

To reduce susceptibility to interference, it is, for example, possible to use additional capacitors to filter the signals. However, in addition to the use of additional components on the primary side, this procedure also results in a certain inaccuracy in the measurement results. These inaccuracies must then be either accepted or corrected in a relatively complex manner. Alternatively, it is possible for a fast-acting evaluating or measuring device with common-mode rejection to be used, for example, on the primary side. However, this is also associated with additional effort and above all with significantly higher costs for the entire switched-mode power supply.

SUMMARY OF THE INVENTION

In view of the foregoing, it is therefore an object of the invention to provide an auxiliary supply for a current supply that achieves an improvement over the prior art, in particular lower susceptibility to interference, above all high-frequency interference, in a simple and cost-saving matter.

This and other objects and advantages are achieved in accordance with the invention by an auxiliary supply for a current supply comprising at least one transformer with a primary side and a secondary side. Here, the auxiliary supply provides a voltage supply independent of the operating state of the current supply on the secondary side of the current supply and consists of at least one frequency generator arranged on the primary side, in particular a high-frequency generator, for generating an alternating voltage with a predetermined frequency, a rectifier unit arranged on the secondary side for a secondary-side supply voltage or a secondary-side supply current and first and second potential separation units, which are arranged between the primary side and the secondary side. The alternating voltage generated by the frequency generator can be transmitted from the primary and the secondary side via the first potential separation unit. Here, the first potential separation unit is connected to the frequency generator on the primary side. The second potential separation unit has a high-frequency coupling to a reference potential of the frequency generator on the primary side. Furthermore, a voltage drop at the impedance can be used for an evaluation of the secondary-side supply voltage.

The main aspect of the solution proposed in accordance with the invention consists in the generation of an auxiliary supply for the secondary side of the switched-mode power supply, where the first potential separation unit is used to transmit the alternating voltage generated by the frequency generator. This alternating voltage is generated by the frequency generator arranged on the primary side and can be rectangular, triangular or sinusoidal, for example. On the secondary side, the alternating voltage or the alternating current is then tapped via the rectifier unit arranged on the secondary side and used, for example, to supply units arranged on the secondary side, such as control electronics or pilot lights.

Furthermore, the impedance attached between the frequency generator and the potential separation unit can be used for the transmission of information or signals from the secondary side to the primary side of the current supply. If a load is imposed on the secondary-side output of the auxiliary supply (for example, with a high-ohmic resistance, such as 8 kiloohm), the secondary supply voltage changes at the output of the auxiliary supply. This also has effects on the alternating voltage on the primary side, for example, at input of the first potential separation unit. The change in the alternating voltage on the primary side enables a change in the secondary supply voltage to be identified and evaluated accordingly with the aid of the voltage drop at the primary-side impedance.

The second potential separation unit is used to couple a secondary side reference potential to the primary side with as little resistivity as possible. This makes the auxiliary supply in accordance with the invention much less susceptible to interference (in particular interference caused by high-frequency fluctuations between the primary and secondary side). This means that neither filtering via capacitors, which results in inaccuracies, nor a complex and expensive measuring device is required for the evaluation of signals or information transmitted from the secondary side to the primary side. Only one potential separation unit is used for transmission in the auxiliary supply according to the invention. As a result, the circuit in accordance with the invention is also relatively easy and inexpensive to implement.

It is furthermore advantageous if, for coupling to the reference potential of the frequency generator, an impedance is connected upstream of the second potential separation unit on the primary side. This impedance can also be formed as a short circuit, i.e., as a resistance with 0 ohm. However, a low-ohmic impedance, for example 100 ohm, which is arranged in series with the second potential separation unit on the primary side, can be used as a protective resistance for example against high voltage pulses from the primary side to the secondary side.

In an expedient embodiment of the auxiliary supply in accordance with the invention, an evaluation unit is arranged on the primary side with which the secondary-side supply voltage can be evaluated. For an evaluation, the evaluation unit uses the change in the primary-side alternating voltage or the voltage drop at the impedance via which the first potential separation unit is connected to the frequency generator. For example, with known impedance on the primary side, it is possible to derive a resistance at the output of the auxiliary supply from the voltage drop, such as on the primary side. Here, the evaluation can for example be performed by analog or digital means and then the corresponding evaluation further processed accordingly, for example, as a signal for a control unit. In this simple way, a passive signal on the secondary side, such as the opening and closing of a contact arranged on the output of the auxiliary supply in accordance with the invention or a change in a resistance at the output of the auxiliary supply in accordance with the invention, enables information to be transmitted to the primary side. The contact for the secondary-side signal at the output of the auxiliary supply is at floating-potential and can, for example, be applied to ground potential or another reference potential. Hence, it is also possible via the rectifier unit to implement the short-circuit contact over a longer distance or over a longer line because it is only necessary to switch direct current.

The first and the second potential separation unit are ideally implemented via capacitors. Hence, energy is transmitted capacitively from the primary side to the secondary side. Furthermore, the use of capacitors has the advantage that standard components can be used and the auxiliary supply implemented in a compact form and inexpensively. For reasons of safety, the capacitors, with which the galvanic isolation unit is implemented are formed as "Y1 capacitors".

In a preferred embodiment of the auxiliary supply in accordance with the invention, a capacitance value of the capacitors used as the potential separation unit can be selected from a capacitance range. Here, an upper limit of this capacitance range is predetermined by a discharge current for personal protection at a frequency of 50 and/or 60 hertz. A lower limit of the capacitance range can be derived from a current to be transmitted at the frequency predetermined by the frequency generator. It is, for example, possible for equally high capacitance values to be selected for the two capacitors used as the potential separation unit. Alternatively, it is, for example, also possible to use a capacitor with a higher capacitance value for the second potential separation unit than the capacitance value of the capacitor used as the first potential separation unit. For reasons of safety, the upper limit for the selection of the capacitors used for a potential separation unit or their capacitance value is defined by the discharge current for personal protection or the so-called contact current (i.e., the current that flows through the body of a person coming into contact with an electrical installation or electrical equipment) at an alternating current of 50 and/or 60 hertz, for which, for reasons of personal protection or to prevent current-related accidents, for example, limit values are specified in corresponding international and/or national safety standards.

Furthermore, it is advantageous for a high-ohmic resistance to be used for the impedance, via which the first potential separation unit is connected on the primary side to the frequency generator. Ideally, an impedance or a resistance in the kiloohm range is used. The further impedance, which can be provided to couple the second potential separation unit to the reference potential of the frequency generator on the primary side, can ideally be a low-ohmic impedance, such as in the range of 100 Ohm.

BRIEF DESCRIPTION OF THE DRAWINGS

The invention is now explained in an exemplary manner with reference to the attached FIGURE, in which:

The FIGURE is a schematic and exemplary embodiment of the auxiliary supply in accordance with the invention for a secondary side of a current supply.

DETAILED DESCRIPTION OF THE EXEMPLARY EMBODIMENTS

The FIGURE is an exemplary schematic diagram of an exemplary embodiment of an auxiliary supply V, which can be used in a current supply. For reasons of improved clarity, the actual current supply is not shown in the FIGURE. The current supply comprises at least one transformer or a converter circuit with a transformer. The transformer establishes a galvanic separation unit between a primary side P and a secondary side S. Here, a link to a current source or a current network is usually located on the primary side P of the current supply. An output voltage for connecting a load or a consumer is supplied at the secondary side S of the current supply.

An auxiliary supply V is provided for a voltage supply for on the secondary side S of the current supply that is independent of the operating state of the current supply. The auxiliary supply V provides a supply current and/or a supply voltage Uv at an output A1, A2 on the secondary side. This supply current or this supply voltage Uv can, for example, be used for units EL arranged on the secondary side (for example secondary-side control electronics, pilot lights, or displays). Furthermore, the auxiliary supply in accordance with the invention V can also be used to evaluate the secondary-side supply voltage Uv or a secondary-side load at output A1, A2 of the auxiliary supply V. It is, for example, possible for a contact K or a load or a load resistance to be provided at the output A1, A2 of the auxiliary supply V via which the output A1, A2 of the auxiliary supply V can be closed.

On the primary side P, which corresponds to the primary side P of the current supply (i.e., this side of the auxiliary supply V is connected to the respective current source or the current network), the auxiliary supply V comprises a frequency generator FG which generates an alternating voltage with a predetermined frequency. The frequency generator FG can in particular be formed as a high-frequency generator in order to generate an alternating voltage in the high kHz or MHz range. Here, the alternating voltage can be rectangular, triangular or sinusoidal. The alternating voltage generated by the frequency generator FG can be transmitted via a first potential separation unit TC1 arranged between the primary side P and the secondary side S. The first potential separation unit TC1 is connected to the frequency generator FG on the primary side via an impedance R1. The impedance R1 can, for example, be formed as a high-ohmic resistance (e.g., a resistance in the kiloohm range). The frequency of the frequency generator FG can, for example, be set such that the first potential separation unit TC1 exhibits an impedance minimum.

Furthermore, the auxiliary supply in accordance with the invention V comprises a second potential separation unit TC2 which, like the first potential separation unit TC1, is arranged between the primary side P and the secondary side S of the auxiliary supply V. The second potential separation unit TC2 has a high-frequency coupling to a primary-side reference potential Pp of the frequency generator FG and connects secondary-side reference potential Ps to the primary side P of the auxiliary supply V. For this purpose, it is, for example, possible for the second potential separation unit TC2 to be coupled via an impedance R2 (e.g., with a resistance value of about 100 ohm) or via a short-circuit (i.e., directly or with an impedance R2 von 0 ohm) to the reference potential Pp of the frequency generator FG.

The first and second potential separation units separate the primary side P of the auxiliary supply V from a secondary side S of the auxiliary supply V, which corresponds to the secondary side or the output side of the current supply. The first and second potential separation units TC1, TC2 represent a galvanic separation unit and are formed as capacitors TC1, TC2. The capacitance values of the capacitors TC1, TC2 can be selected from a capacitance range with, for reasons of safety, an upper limit predetermined by a discharge current for personal protection at a frequency of 50 hertz and/or 60 hertz. The lower limit of the capacitance range can be derived from a current to be transmitted at the frequency predetermined by the frequency predetermined by the frequency generator (FG). The capacitances of the two capacitors TC1, TC2 can, for example, be selected as equally high or a higher value is selected for the capacitance of the second potential separation unit TC2 than for the capacitance of the first potential separation unit TC1.

Furthermore, for reasons of safety (for example, so that the contact K at output A1, A2 can be safely opened or closed by a user), the capacitors TC1, TC2 are, for example, formed as "Y1 capacitors". Y1 capacitors (for example, in accordance with the corresponding IEC standard) have increased insulation or a checkable increased electrical and mechanical safety and may, therefore, be used between the primary side P, which is connected to a current source or the current network, and the secondary side S.

On the secondary side, the first potential separation unit TC1 is connected to a rectifier unit GL, for example, consisting of two diodes. With the aid of the rectifier unit GL, a supply current or a supply voltage Uv is provided on the secondary side. The supply voltage Uv can, for example, be tapped on the secondary side S of the current supply or the auxiliary supply V at the output of the rectifier unit GL at terminals A1, A2. The supply voltage Uv that can be tapped at the terminals A1, A2 is independent of the respective operating state of the switched-mode power supply.

A secondary-side installation EL (e.g., control logic, or a pilot light) can be connected to these terminals A1, A2. Alternatively, the terminals A1, A2 can be short-circuited by means of the contact K or loaded with a load or a load resistance. Here, the terminals A1, A2 are at floating potential, i.e., they can be applied to any, secondary-side reference potential Ps. The second potential separation unit TC2 is connected to this secondary-side reference potential Ps on the secondary side, as a result of which the primary side P has a low-ohmic capacitive coupling to the secondary-side reference potential Ps via the second potential separation unit TC2.

Optionally, filtering F consisting of a capacitor C and a resistance RF can also be provided on the secondary side S of the auxiliary supply V. Here, the filtering F herein is attached to the output side of the rectifier unit GL in order, for example, to smooth the supply voltage Uv generated via the rectifier unit GL.

The secondary-side supply voltage Uv or the secondary-side load at output A1, A2 of the auxiliary supply V can be evaluated P using a voltage drop at the impedance R1 arranged between the first potential separation unit TC1 and the frequency generator FG on the primary side. Furthermore, the auxiliary supply V on the primary side P comprises an evaluation unit AW, which is linked to a connection L the first potential separation unit TC1 and the frequency generator FG or the impedance R1.

In order to generate a supply current or a supply voltage Uv on the secondary side S, an alternating voltage with a predetermined frequency is generated by the frequency generator FG. Usually, an alternating voltage with a high frequency (e.g., 100 kHz, or 1 MHz) is generated. The alternating voltage generated by the frequency generator FG is transmitted by the first potential separation unit TC1 to the secondary side S and can be tapped via the rectifier unit GL. If the output A1, A2 of the auxiliary supply V or the rectifier unit GL is now, for example, loaded with an installation EL or a load resistance or closed via a contact K, the alternating voltage or the voltage drop at the impedance R1 arranged between the frequency generator FG and the first potential separation unit TC also changes accordingly on the primary side P. This change can be detected and evaluated via the evaluation unit AW.

The evaluation of the primary-side voltage drop or a derivation of the load at output A1, A2 of the auxiliary supply V be performed by either analog or digital means. The results ascertained with the evaluation unit AW can then be further processed accordingly. In this way, a passive signal on the secondary side S, such as an opening and/or closing of the contact K at output A1, A2 of the auxiliary supply V or a change to the resistance EL at output A1, A2 of the auxiliary supply V, can be transmitted as information to the primary side P of the auxiliary supply V.

When a contact K is used for a secondary-side signal at output A1, A2 of the auxiliary supply HV, this contact K is at floating potential and can, for example, be applied to the secondary-side reference potential Ps. The information transmitted from the secondary side S to the primary side P (for example, opening and/or closing of the contacts K) can be used, for example, for switching-on and switching-off the current supply.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An auxiliary supply for a current supply with at least one transformer with a primary side and a secondary side, the auxiliary supply providing a voltage supply which is independent of an operating state of current supplied on the secondary side of the current supply, the auxiliary supply comprising:
    a frequency generator arranged on the primary side for generating an alternating voltage with a predetermined frequency;
    a rectifier unit arranged on the secondary side for a secondary-side supply voltage; and
    a first potential separation unit and a second potential separation unit arranged between the primary side and the secondary side;
    wherein the first potential separation unit, via which the alternating voltage generated by the frequency generator is transmitted, is connected to the frequency generator on the primary side via an impedance;
    wherein the second potential separation unit has a high-frequency coupling to a reference potential assigned to the frequency generator on the primary side; and
    wherein a voltage drop at the impedance is utilized to evaluate the secondary-side supply voltage.

2. The auxiliary supply as claimed in claim 1, wherein an impedance for a coupling to the reference potential of the frequency generator is connected upstream of the second potential separation unit on the primary side.

3. The auxiliary supply as claimed in claim 1, wherein, on the primary side, the auxiliary supply further comprises an evaluation unit for evaluating the secondary-side supply voltage.

4. The auxiliary supply as claimed in claim 2, wherein, on the primary side, the auxiliary supply further comprises an evaluation unit for evaluating the secondary-side supply voltage.

5. The auxiliary supply as claimed in claim 1, wherein the first and the second potential separation units are implemented via capacitors.

6. The auxiliary supply as claimed in claim 2, wherein the first and the second potential separation units are implemented via capacitors.

7. The auxiliary supply as claimed in claim 2, wherein the first and the second potential separation units are implemented via capacitors.

8. The auxiliary supply as claimed in claim 5, wherein the capacitors comprise Y1 capacitors.

9. The auxiliary supply as claimed in claim 5, wherein a capacitance value of the capacitors is selectable from a capacitance range; and wherein an upper limit of the capacitance range is predetermined by a discharge current for personal protection at a frequency of at least one of (i) 50 hertz and (ii) 60 hertz and a lower limit of the capacitance range is derivable from a current to be transmitted at the frequency predetermined by the frequency generator.

10. The auxiliary supply as claimed in claim 6, wherein a capacitance value of the capacitors is selectable from a capacitance range; wherein an upper limit of the capacitance range is predetermined by a discharge current for personal protection at a frequency of at least one of (i) 50 hertz and (ii) 60 hertz and a lower limit of the capacitance range is derivable from a current to be transmitted at the frequency predetermined by the frequency generator.

11. The auxiliary supply as claimed in claim 1, wherein a high-ohmic resistance is utilized for the impedance via which the first potential separation unit is connected on the primary side to the frequency generator.

12. The auxiliary supply as claimed in claim 1, wherein the high-ohmic resistance is a resistance in the kilo ohm range.

* * * * *